US012553609B2

(12) United States Patent
Ackermann et al.

(10) Patent No.: US 12,553,609 B2
(45) Date of Patent: Feb. 17, 2026

(54) INTERCOOLED COMBUSTOR NOZZLE GUIDE VANE AND SECONDARY AIR CONFIGURATION

(71) Applicant: RTX Corporation, Farmington, CT (US)

(72) Inventors: William K. Ackermann, East Hartford, CT (US); Thomas E. Clark, Wells, ME (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/639,450

(22) Filed: Apr. 18, 2024

(65) Prior Publication Data

US 2024/0353104 A1  Oct. 24, 2024

Related U.S. Application Data

(60) Provisional application No. 63/460,221, filed on Apr. 18, 2023.

(51) Int. Cl.
*F23R 3/00* (2006.01)
*F02C 7/14* (2006.01)

(52) U.S. Cl.
CPC ............... *F23R 3/005* (2013.01); *F02C 7/14* (2013.01); *F23R 3/002* (2013.01); *F05D 2240/35* (2013.01); *F05D 2260/211* (2013.01); *F05D 2260/213* (2013.01)

(58) Field of Classification Search
CPC .. F01D 5/081; F01D 5/082; F02C 7/18; F02C 7/185; F02C 6/08
See application file for complete search history.

(56) References Cited

U.S. PATENT DOCUMENTS

| 4,425,079 A | 1/1984 | Speak | |
|---|---|---|---|
| 7,743,613 B2 * | 6/2010 | Lee | F01D 25/12 415/115 |
| 10,393,024 B2 | 8/2019 | Stevens | |
| 2003/0167775 A1 * | 9/2003 | Soechting | F02C 7/18 60/785 |
| 2011/0088405 A1 * | 4/2011 | Turco | F02C 7/185 60/785 |

(Continued)

*Primary Examiner* — David P. Olynick
(74) *Attorney, Agent, or Firm* — Getz Balich LLC

(57) ABSTRACT

A gas turbine engine is provided that includes compressor and combustor sections, inner and outer casings, an annular diffuser, an inner diffuser casing, a heat exchanger, and an HPT stator vane stage. An annular combustor is disposed radially inward of the outer casing and has inner and outer radial wall structures. The outer casing and the combustor outer radial wall structure define a diffuser OD flow path. The annular diffuser directs diffuser gas towards the combustor section. The inner diffuser casing is disposed radially inward of the annular combustor and spaced apart from the combustor inner radial wall structure. The inner casing is disposed radially inward of and spaced apart from the inner diffuser casing. The inner diffuser casing and the inner casing define an ICF passage. The heat exchanger is configured to produce intercooler gas. Intercooler gas is directed through the ICF passage and into the HPT stator vanes.

18 Claims, 12 Drawing Sheets

(56) References Cited

U.S. PATENT DOCUMENTS

| | | | |
|---|---|---|---|
| 2012/0321453 A1* | 12/2012 | Alvanos | F01D 5/081 29/889.3 |
| 2016/0108748 A1* | 4/2016 | Harris | F01D 9/042 415/177 |
| 2016/0186606 A1* | 6/2016 | Blaney | F01D 25/12 415/116 |
| 2016/0208703 A1* | 7/2016 | Hill | F01D 25/12 |
| 2021/0285375 A1* | 9/2021 | Wiedenhoefer | F02C 7/18 |

* cited by examiner

INTERCOOLED COMBUSTOR NOZZLE GUIDE VANE AND SECONDARY AIR CONFIGURATION

This application claims priority to U.S. Patent Appln. No. 63/460,221 filed Apr. 18, 2023, which is hereby incorporated herein by reference in its entirety.

BACKGROUND OF THE INVENTION

1. Technical Field

The present disclosure relates gas turbine engines in general and to gas turbine engine cooling air systems and secondary air configurations in particular.

2. Background Information

Gas turbine engines often operate at high temperatures. This is particularly true in the turbine section. As engine efficiency and power increases, internal temperatures may rise. As a result, gas turbine engines may depend on a cooling airflow to protect components and ensure longevity. Typically, combustor bypass air used as a cooling air may flow along various airflow paths to cool rotating blades, stator vanes, and/or other engine components. The cooling air may rise in temperature due to a variety of factors. It would be beneficial to provide a cooling system that is an improvement over known cooling systems.

SUMMARY

According to an aspect of the present disclosure, a gas turbine engine is provided that includes an axial centerline, a compressor section, an outer casing, a combustor section, an annular diffuser, an inner diffuser casing, an inner casing, a heat exchanger, and a first high-pressure turbine (HPT) stator vane stage. The combustor section has an annular combustor disposed radially inward of the outer casing. The annular combustor has a combustion chamber disposed radially between a combustor inner and outer radial wall structures. The outer casing and the combustor outer radial wall structure define a diffuser OD flow path. The annular diffuser is disposed between the compressor section and the annular combustor. The annular diffuser is configured to direct diffuser gas towards the combustor section. The inner diffuser casing is disposed radially inward of the annular combustor and spaced apart from the combustor inner radial wall structure. The inner casing is disposed radially inward of and spaced apart from the inner diffuser casing. The inner diffuser casing and the inner casing define an ICF passage. The heat exchanger is configured to selectively cool a portion of the diffuser gas-intercooler gas. The first HPT stator vane stage has a plurality of first HPT stator vanes. A first portion of the intercooler gas is directed through the ICF passage and into the HPT stator vanes.

In any of the aspects or embodiments described above and herein, the annular combustor may be configured such that a first portion of the diffuser gas (diffuser OD flow) is directed into the diffuser OD flow path, and a first portion of the diffuser OD flow is directed to the heat exchanger.

In any of the aspects or embodiments described above and herein, a second portion of the diffuser OD flow may be directed into the first HPT stator vanes.

In any of the aspects or embodiments described above and herein, the second portion of the diffuser OD flow may be directed into a first internal zone of each respective first HPT stator vane and the intercooler gas may be directed into a second internal zone of each respective first HPT stator vane.

In any of the aspects or embodiments described above and herein, the first internal zone of each respective first HPT stator vane may be independent of the second internal zone of each respective first HPT stator vane.

In any of the aspects or embodiments described above and herein, the first internal zone of each respective first HPT stator vane may be contiguous with a leading edge of the respective first HPT stator vane.

In any of the aspects or embodiments described above and herein, the second internal zone of each respective first HPT stator vane may be contiguous with a trailing edge of the respective first HPT stator vane.

In any of the aspects or embodiments described above and herein, the engine may further include a tangential onboard injector (TOBI) that extends circumferentially around the engine axial centerline, the TOBI having a plurality of nozzles, an inner radial side, and an outer radial side. A second portion of the intercooler air may be directed through the TOBI nozzles.

In any of the aspects or embodiments described above and herein, the TOBI may include a plurality of first TOBI outer radial cavities disposed radially outside of the TOBI nozzles and a plurality of first TOBI entry passages. Each respective first TOBI entry passage may be configured to provide fluid communication between the ICF passage and a respective first TOBI outer radial cavity.

In any of the aspects or embodiments described above and herein, the TOBI may include a plurality of first TOBI exit passages. Each respective first TOBI exit passage may be configured to provide fluid communication between a respective first TOBI outer radial cavity and a first turbine stator vane cavity disposed radially inward of the first HPT stator vane stage.

In any of the aspects or embodiments described above and herein, the TOBI may include a plurality of second TOBI outer radial cavities disposed radially outside of the TOBI nozzles and a plurality of second TOBI entry passages. Each respective second TOBI entry passage may be configured to provide fluid communication from the inner radial side of the TOBI to a respective second TOBI outer radial cavity.

In any of the aspects or embodiments described above and herein, the TOBI may include a plurality of second TOBI exit passages. Each respective second TOBI exit passage may be configured to provide fluid communication between a respective second TOBI outer radial cavity and an aft TOBI annular compartment.

In any of the aspects or embodiments described above and herein, the second TOBI entry passages may be configured to receive compressor leakage air passing from the compressor section.

In any of the aspects or embodiments described above and herein, the aft TOBI annular compartment may be configured to permit a portion of the compressor leakage air to pass into a cavity disposed forward of a first HPT rotor stage.

In any of the aspects or embodiments described above and herein, each first HPT stator vane may include an inner platform having a pressure wall component extending out from at a forward end of the inner platform and an aft member extending out from an aft end of the inner platform.

In any of the aspects or embodiments described above and herein, the pressure wall component of each first HPT stator vane may be engaged with the TOBI and a seal is disposed therebetween.

In any of the aspects or embodiments described above and herein, the TOBI may include a forward wall and the pressure wall component of each first HPT stator vane may be disposed adjacent a portion of the TOBI forward wall and the seal is disposed therebetween.

In any of the aspects or embodiments described above and herein, the TOBI may include a plurality of first TOBI exit passages. Each respective first TOBI exit passage may be configured to provide fluid communication between a respective first TOBI outer radial cavity and a first turbine stator vane cavity disposed radially inward of the first HPT stator vane stage. The first turbine stator vane cavity may be defined by a portion of the pressure wall component, the first HPT stator vane inner platform, the inner platform aft member, and a portion of an aft wall of the TOBI.

In any of the aspects or embodiments described above and herein, the inner diffuser casing and the combustor inner radial wall structure may define a diffuser inner diameter flow path (diffuser ID flow path), and the inner diffuser casing may be configured such that a second portion of the diffuser gas (diffuser ID flow) is directed into a core gas path forward of the first HPT stator vane stage.

In any of the aspects or embodiments described above and herein, the engine may be configured to pass a fan air through the heat exchanger.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
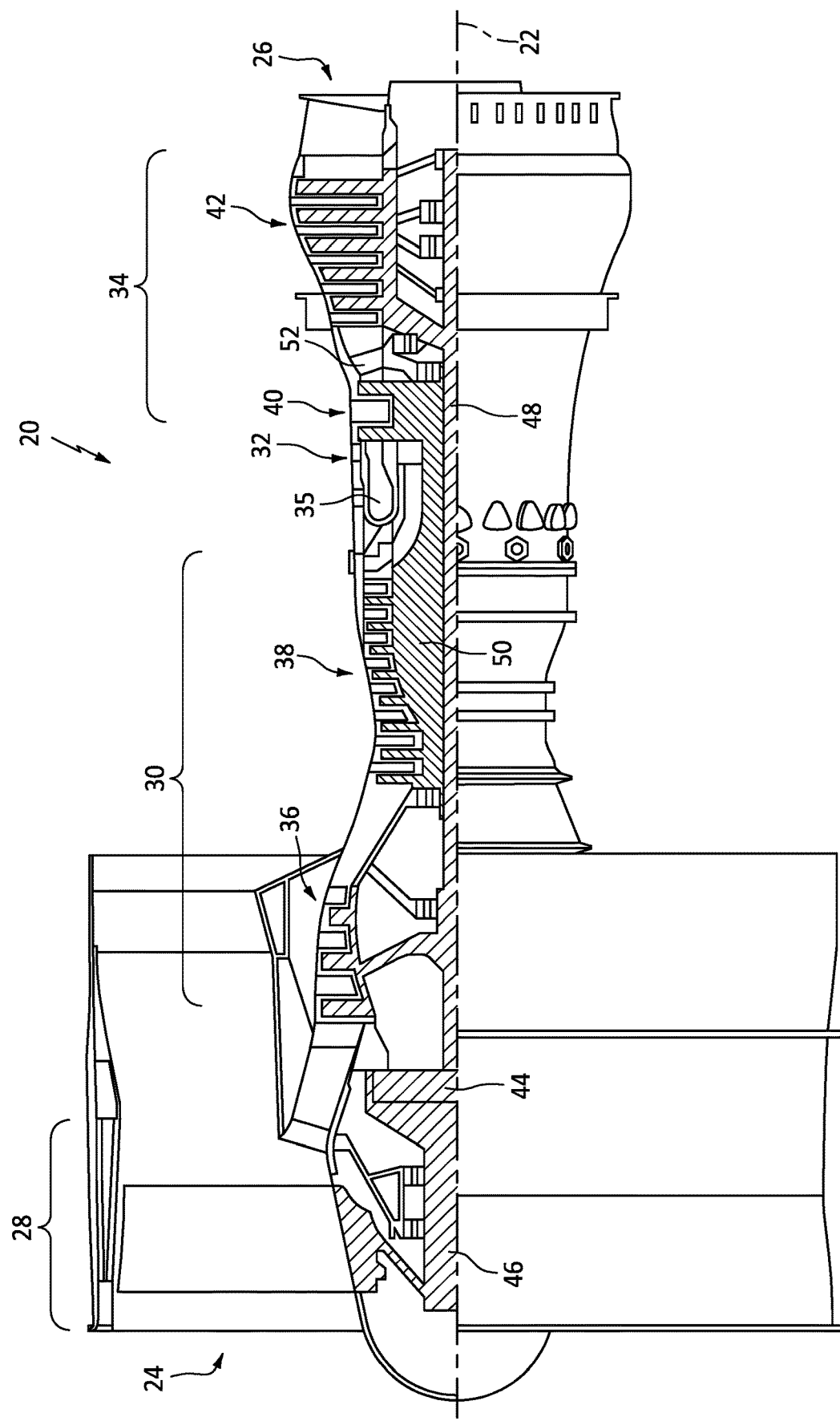
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section includes a low-pressure compressor (LPC) 36 and a high-pressure compressor (HPC) 38. The turbine section 34 includes a high-pressure turbine (HPT) 40 and a low-pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section is "forward" of the compressor section and the turbine section is "aft" of the compressor section. The terms "inner radial" and "outer radial" refer to relative radial positions from the engine centerline. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well three spool gas turbine engines and the like.

Figure 2:
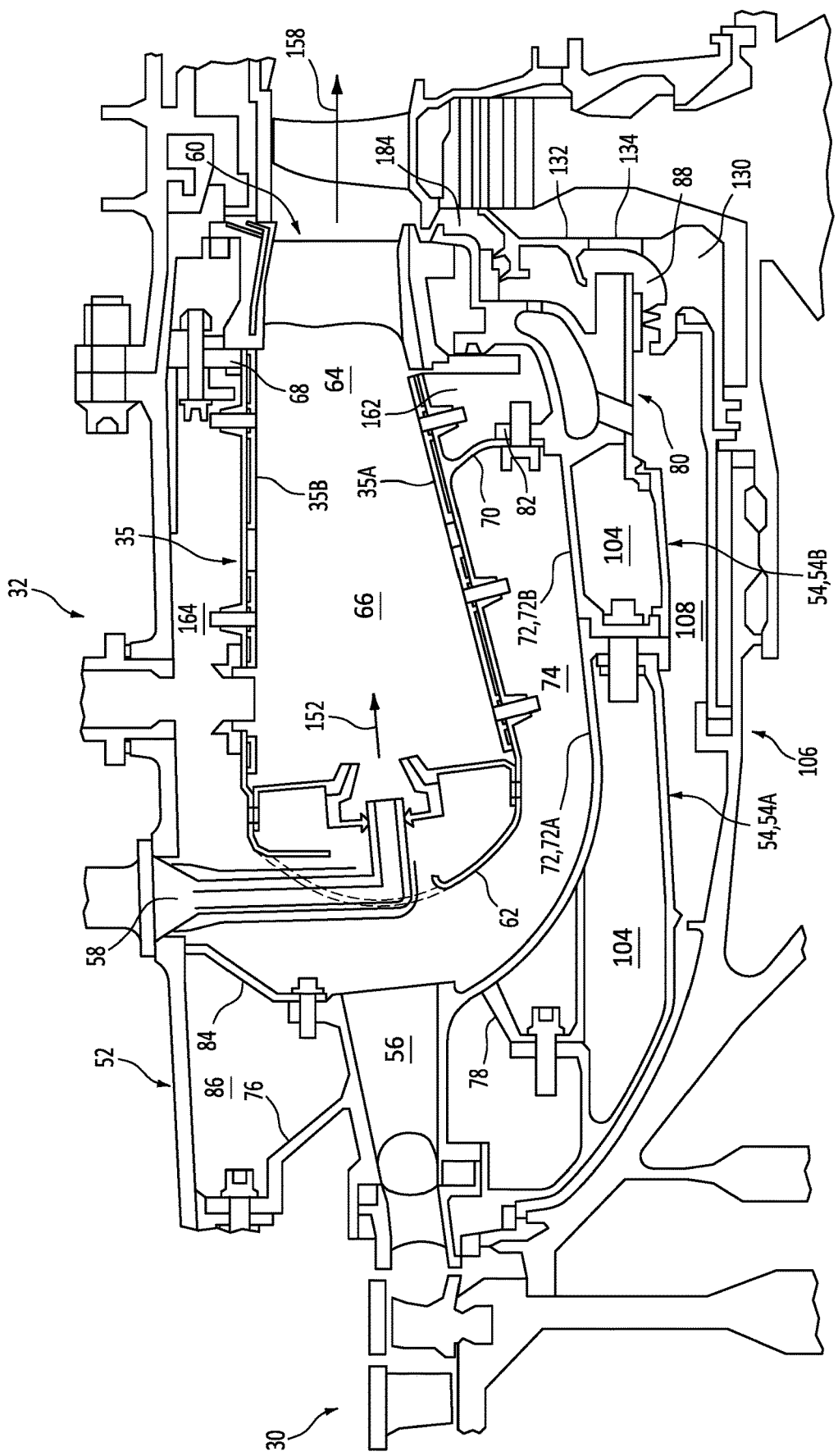
FIG. 2 is a diagrammatic sectioned partial view of a gas turbine engine embodiment.

FIG. 2 is a diagrammatic cross-sectional partial view of a gas turbine engine 20 embodiment according to aspects of the present disclosure. FIG. 2 shows the outer casing 52, inner casing 54, annular diffuser 56, combustor section 32, combustor fuel nozzles 58, and a portion of the HPT (i.e., the first HPT stator vane stage 60). The annular diffuser 56 is disposed between the compressor 30 (e.g., the HPC) and the annular combustor 35. The outer casing 52 is disposed radially outside of the combustor section 32 and the inner casing 54 is disposed radially inside of the combustor section 32.

The combustor section 32 includes an annular combustor 35 having an inner radial wall structure 35A, an outer radial wall structure 35B, a forward bulkhead 62, an aft annular exit 64, a combustion chamber 66, an outer radial flange 68, and an inner radial flange 70. The combustion chamber 66 is defined by the inner and outer radial wall structures 35A, 35B, the forward bulkhead 62, and the aft annular exit 64. The outer radial flange 68 extends radially outwardly proximate the aft annular exit 64 and is engaged with the outer casing 52. The inner radial flange 70 extends radially inwardly from the inner radial wall structure 35A and is configured for engagement with an inner diffuser case 72. A portion of each combustor fuel nozzle 58 is received within the forward bulkhead.

The combustor section 32 further includes an inner diffuser case 72 that extends aftward from the annular diffuser 56, radially inward of and spaced apart from the combustor inner radial wall structure 35A. The annular region defined between the combustor inner radial wall structure 35A and the inner diffuser case 72 may be referred to as the diffuser inner diameter (ID) flow path ("diffuser ID flow path 74"). The inner diffuser case 72 may be a one-piece structure or may comprise a plurality of segments. In the nonlimiting embodiment shown in FIG. 2, the inner diffuser case 72 includes a forward segment 72A and an aft segment 72B that are mechanically attached to one another; e.g., by fasteners. The forward segment 72A of the inner diffuser case 72 is integrally formed with the annular diffuser 56. A first outer radial flange 76 extends radially outward from the annular diffuser 56 (e.g., integrally formed therewith) and engages with the outer casing 52. In some embodiments, the inner diffuser case 72 may further include an inner radial flange 78 disposed proximate the annular diffuser 56. The aft segment 72B of the inner diffuser case 72 may be integrally formed with the TOBI 80. The aft segment 72B includes a flange 82 configured for attachment to the combustor inner radial flange 70; e.g., by fastener.

In the non-limiting embodiment shown in FIG. 2, a second outer radial flange 84 is included, disposed aft of the first outer radial flange 76. The second outer radial flange 84 may be attached to the annular diffuser 56 and may extend radially outward from the annular diffuser 56 for engagement with the outer casing 52. An annular outer radial cavity 86 is defined by the first and second outer radial flanges 76, 84, the annular diffuser 56, and the outer casing 52.

Figure 4:
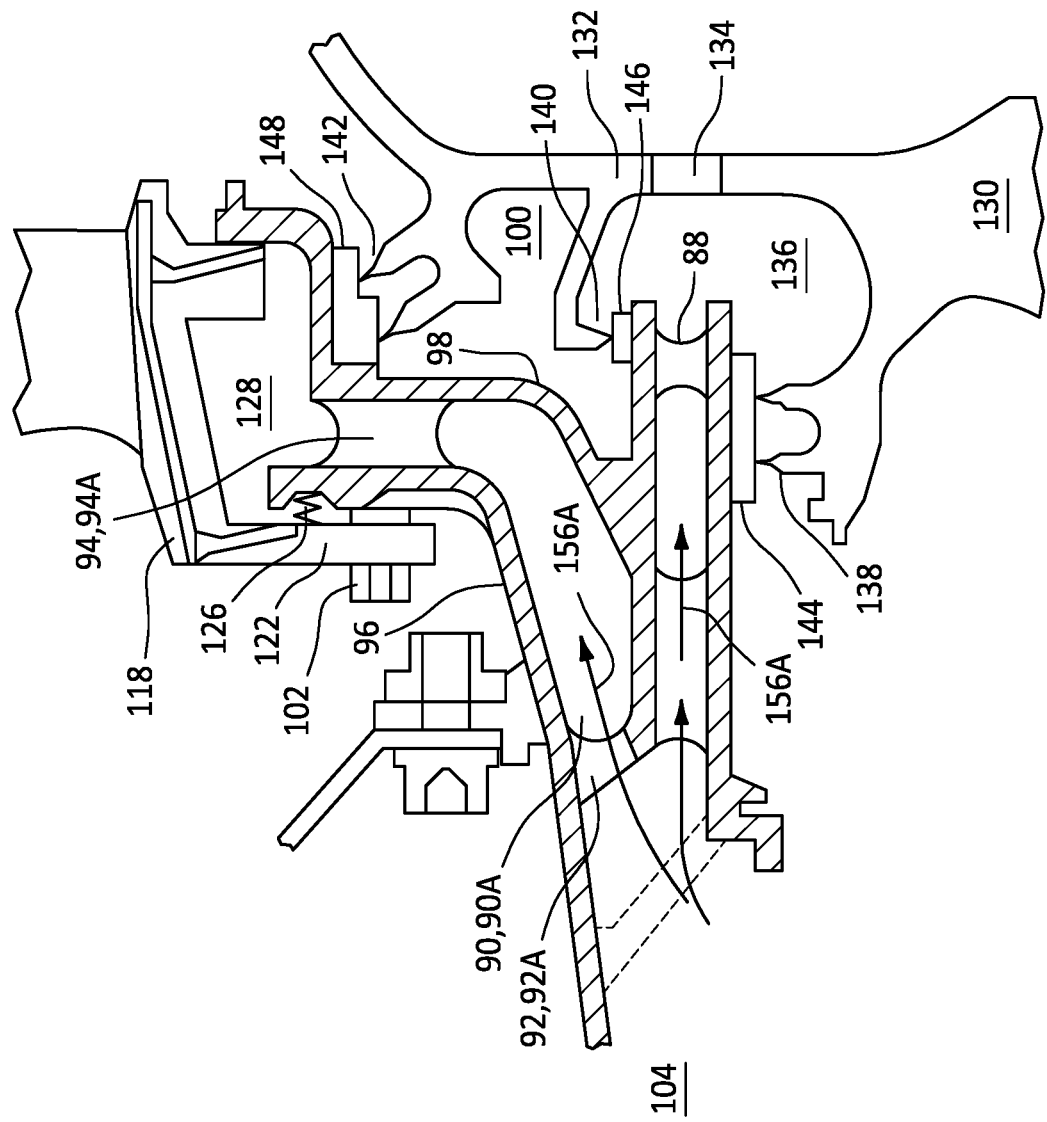
FIG. 4 is a diagrammatic representation of a portion of a first HPT stator vane stage embodiment, a portion of an inner diffuser case embodiment, and a TOBI embodiment, combined with one another.

The TOBI 80 may include a plurality of nozzles 88, a plurality of TOBI outer radial cavities 90, a plurality of cavity entry passages 92, and a plurality of cavity exit passages 94 (e.g., See FIG. 4). The nozzles 88 are spaced apart from one another around the circumference of the TOBI 80. The TOBI 80 may be described as having an inner radial side and an outer radial side. The TOBI outer radial cavities 90 (disposed on the outer radial side) are defined by a forward wall 96 (contiguous with the inner diffuser case 72) and an aft wall 98. As will be described herein, in some embodiments the TOBI outer radial cavities 90 may include TOBI first radial cavities 90A (see FIG. 4) and second outer radial cavities 90B (see FIG. 5) that are independent of one another (circumferentially separated from one another) such that flow passing through a TOBI first outer radial cavity 90A cannot pass into a TOBI second outer radial cavity 90B and vice versa.

Figure 3:
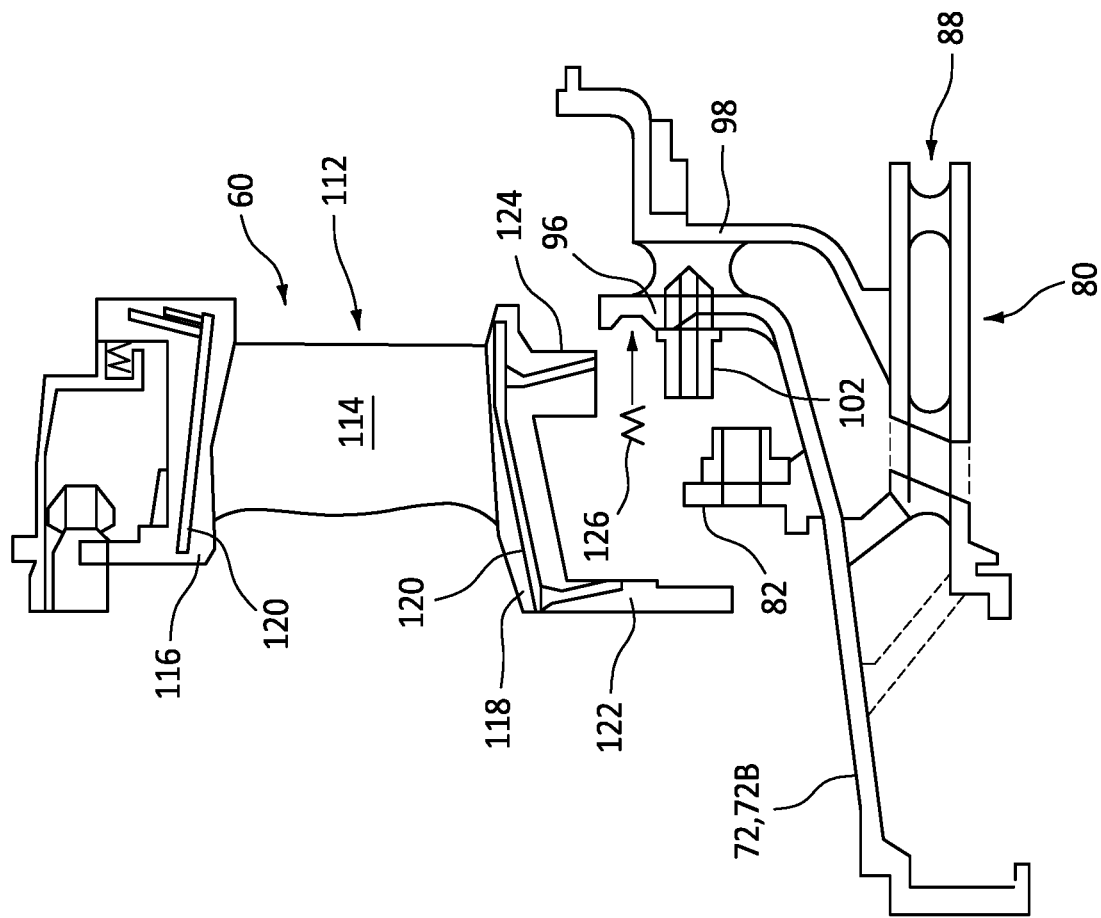
FIG. 3 is a diagrammatic representation of a first HPT stator vane stage embodiment, a portion of an inner diffuser case embodiment, and a TOBI embodiment, separated from one another.
Figure 3A:
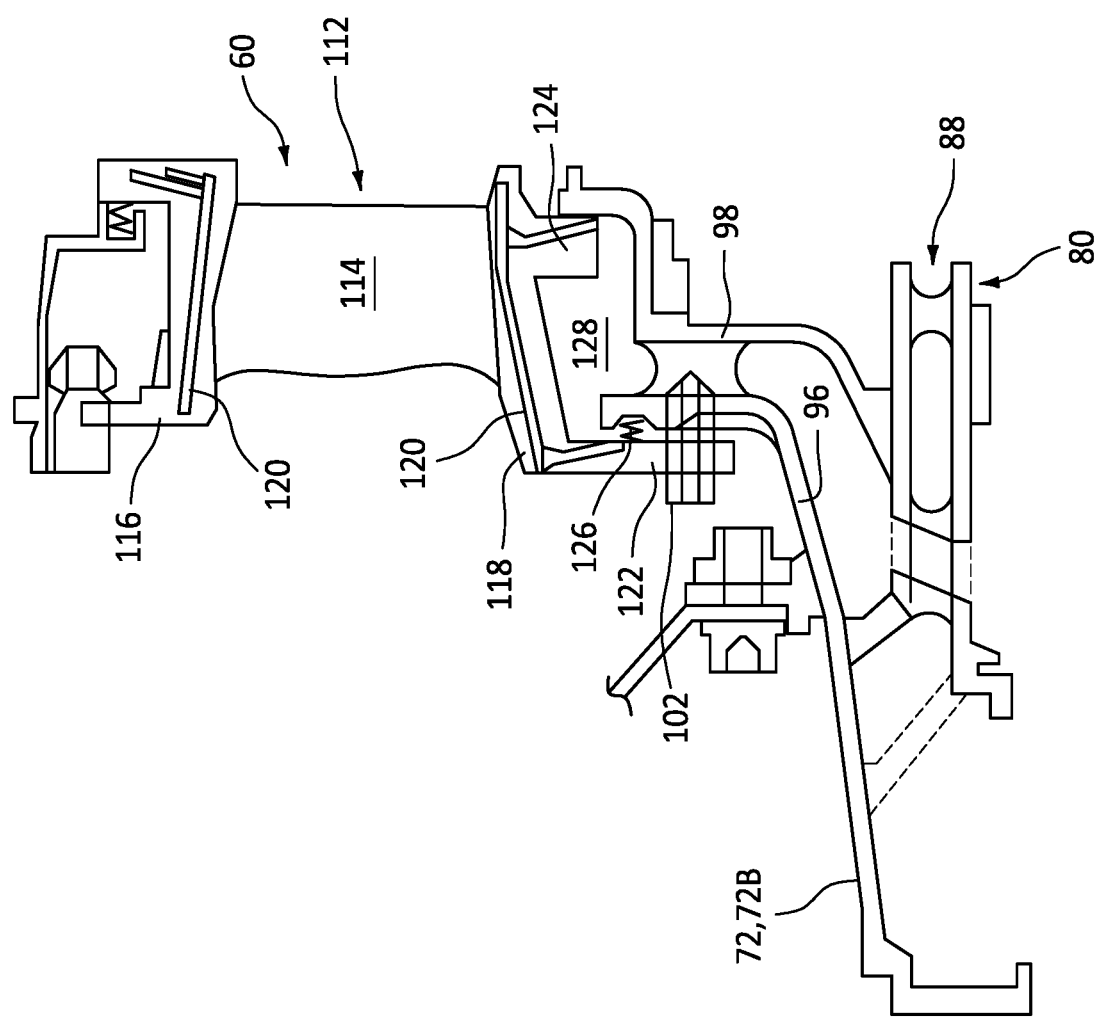
FIG. 3A diagrammatically illustrates the elements shown in FIG. 3, now in combined form.
Figure 3B:
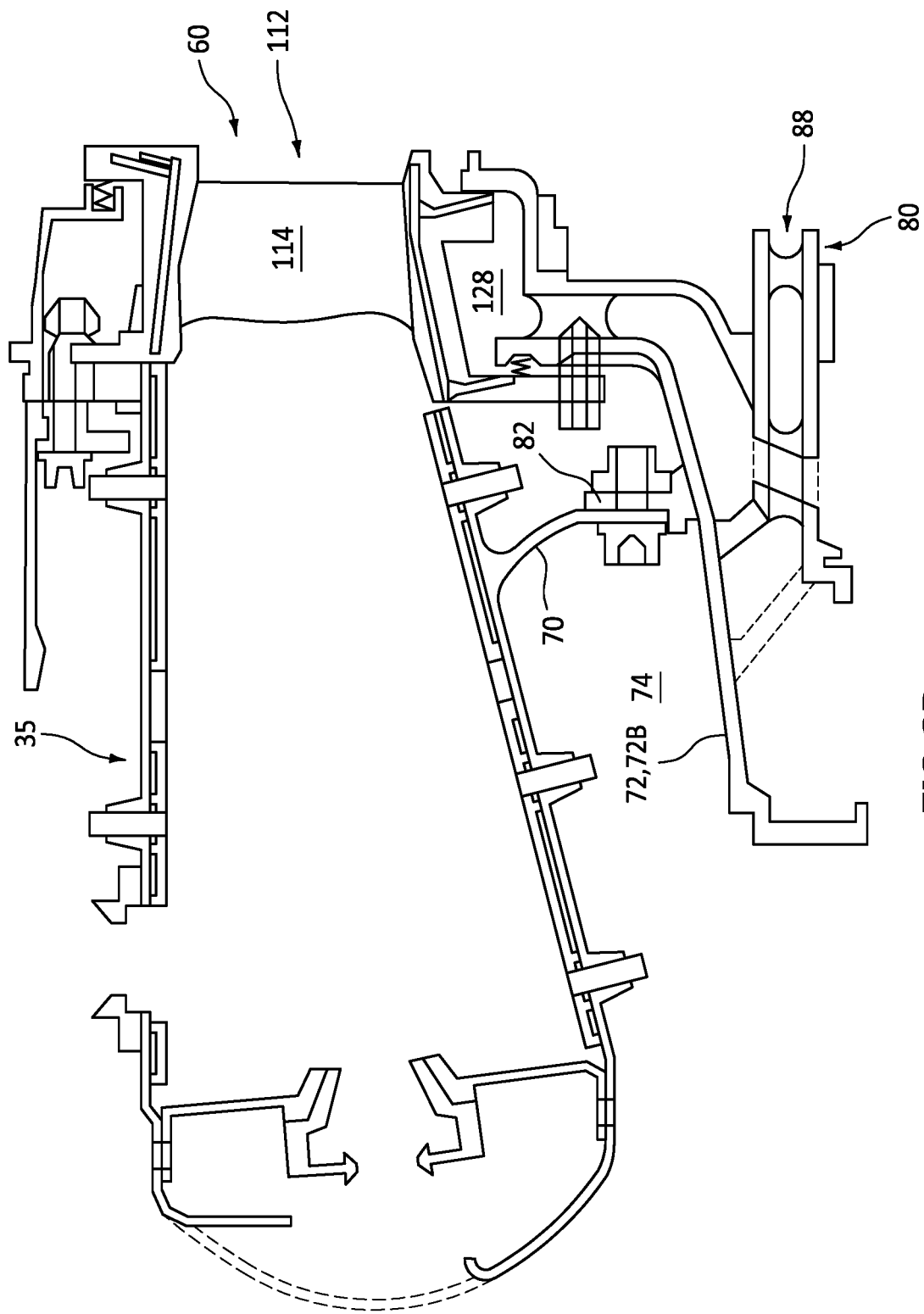
FIG. 3B diagrammatically illustrates the combined elements shown in FIG. 3A, now coupled with an annular combustor embodiment.

FIG. 3 diagrammatically illustrates the first HPT stator vane stage 60, a portion of the inner diffuser case 72, and the TOBI 80, with the first HPT stator vane stage 60 separated. FIG. 3A illustrates the same now combined. FIG. 3B illustrates the first HPT stator vane stage 60, a portion of the inner diffuser case 72, and the TOBI 80, combined with one another, and also coupled with the annular combustor 35.

Figure 5:
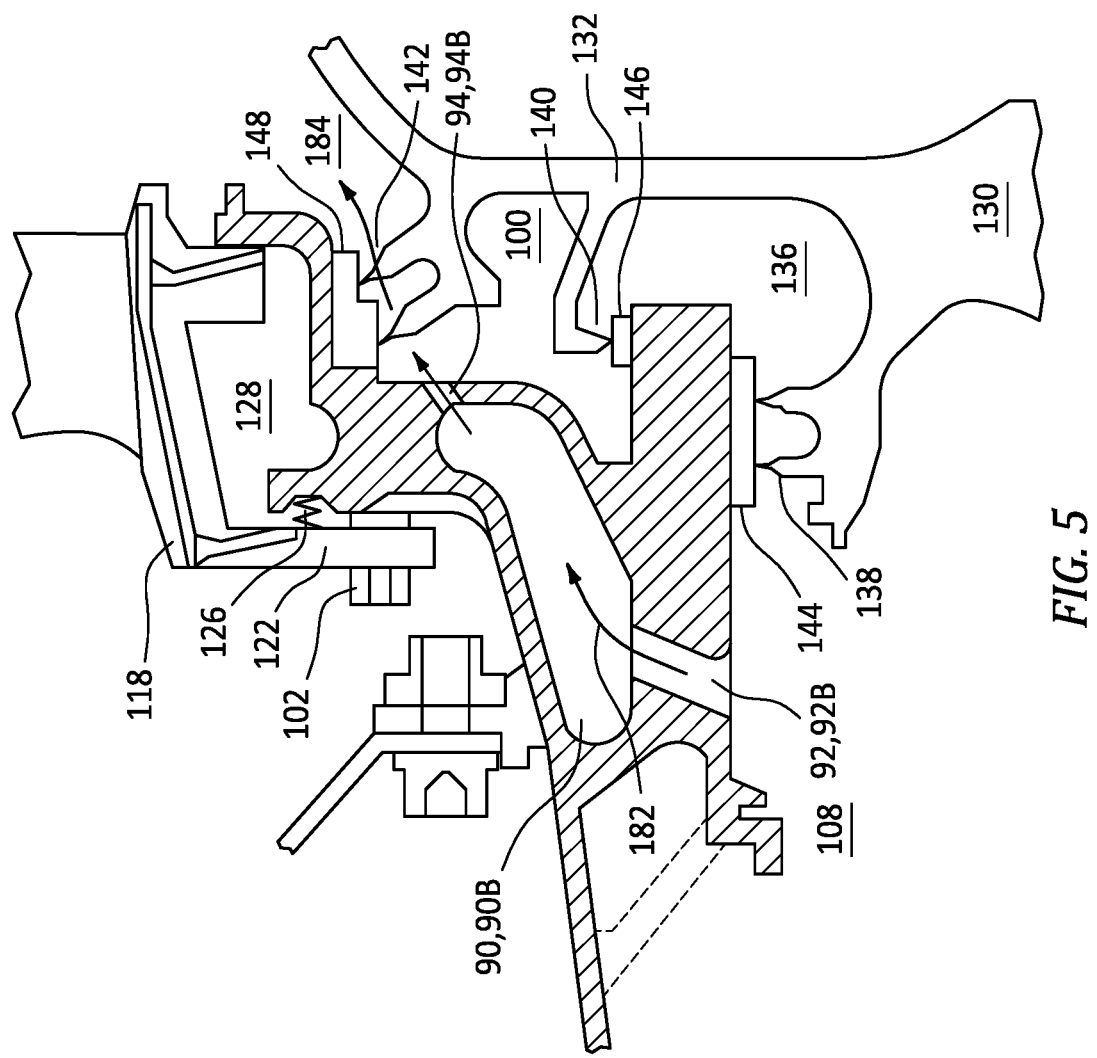
FIG. 5 is a diagrammatic representation of a portion of a first HPT stator vane stage embodiment, a portion of an inner diffuser case embodiment, and a TOBI embodiment, combined with one another.

The cavity entry passages 92 may include more than one entry passage configuration. For example, FIG. 4 illustrates a first entry passage 92A configuration that provides fluid communication between the ICF passage 104 (detailed below) and a TOBI first outer radial cavity 90A. FIG. 5 illustrates a second entry passage 92B configuration that provides fluid communication between the compressor leakage air (CLA) passage 108 (detailed below) and a TOBI second outer radial cavity 90B. The second entry passage 92B configuration provides fluid communication from the inner to the outer radial side of the TOBI 80. The first and second cavity entry passages 92A, 92B are distributed around the circumference of the annular TOBI 80; e.g., at circumferential positions between TOBI nozzles 88. The present disclosure is not limited to these first and second entry passage 92A, 92B configurations.

The cavity exit passages 94 include more than one exit passage configuration. For example, FIG. 4 illustrates a first exit passage 94A configuration that provides fluid communication between the TOBI first outer radial cavity 90A and the first turbine vane cavity 128 (detailed below). FIG. 5 illustrates a second exit passage 94B configuration that provides fluid communication between the TOBI second outer radial cavity 90B and an aft TOBI annular compartment 100 (detailed below). The cavity exit passages 94A, 94B are distributed around the circumference of the annular TOBI 80; e.g., at circumferential positions between TOBI nozzles 88. The present disclosure is not limited to these first and second exit passage 94A, 94B configurations.

Figure 5A:
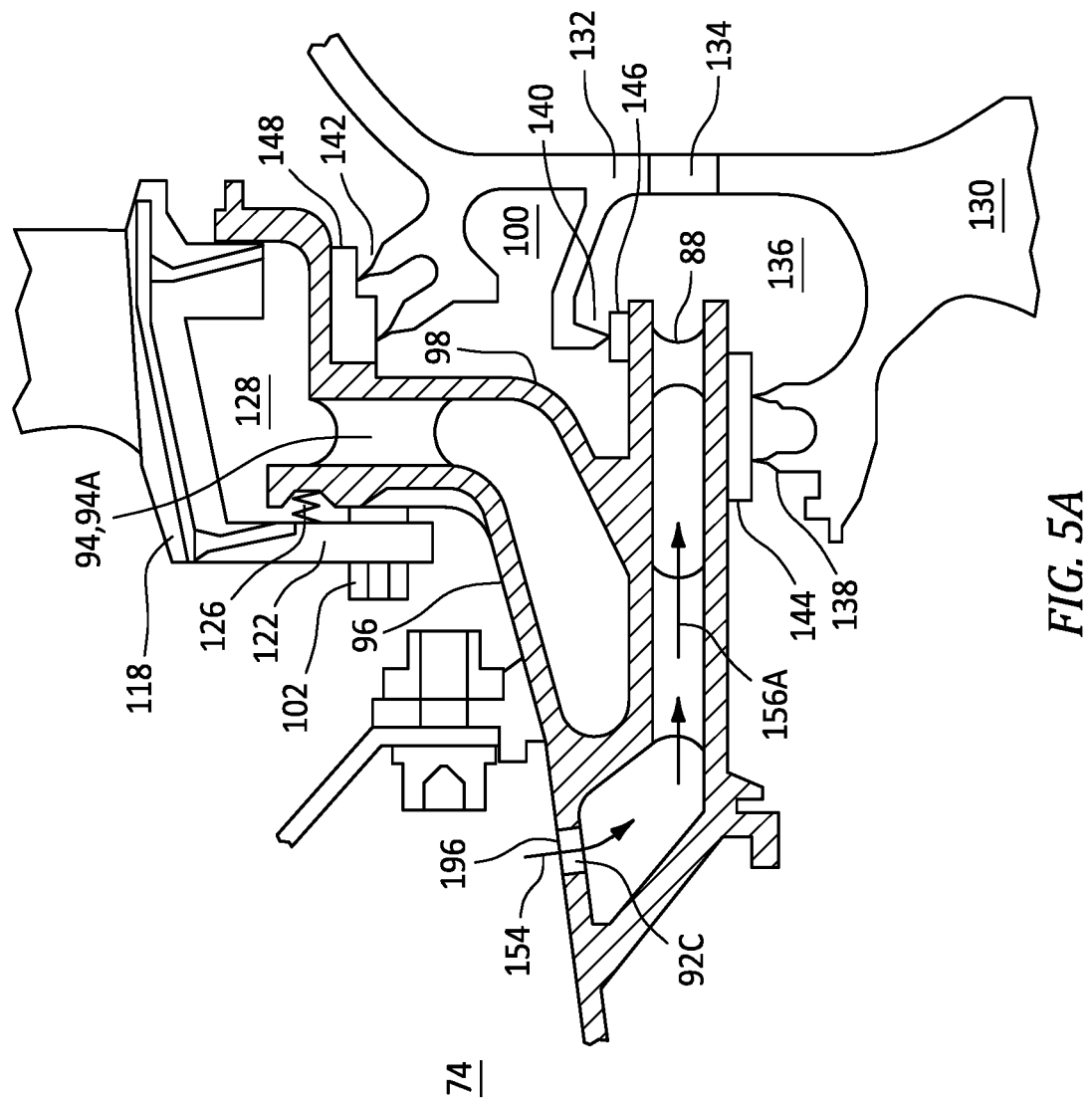
FIG. 5A is a diagrammatic representation of a portion of a first HPT stator vane stage embodiment, a portion of an inner diffuser case embodiment, and a TOBI embodiment, combined with one another.

FIG. 5A illustrates an embodiment having a cavity entry passage 92C that provides fluid communication between the diffuser ID flow path 74 and the TOBI nozzles 88. In this embodiment, diffuser ID flow 154 may pass from the diffuser ID flow path 74 through apertures 196 disposed in the TOBI forward wall 96.

Figure 6:
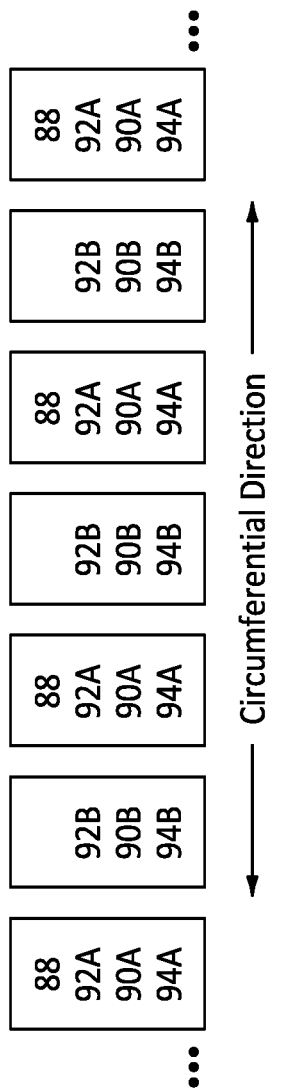
FIG. 6 is a diagrammatic linear representation of circumferential positioning of TOBI elements.

FIG. 6 diagrammatically illustrates a non-limiting example of circumferential positioning of TOBI nozzles 88, TOBI first entry passages 92A, TOBI first outer radial cavities 90A, TOBI first exit passages 94A, TOBI second entry passages 92B, TOBI second outer radial cavities 90B, and TOBI second exit passages 94B in a linear representation. FIG. 6 diagrammatically illustrates a "first TOBI group" that includes the TOBI nozzles 88, TOBI first entry passages 92A, TOBI first outer radial cavities 90A, and TOBI first exit passages 94A generally aligned with one another at a circumferential position to represent that the elements in the first TOBI group are generally circumferentially aligned with one another in a manner that permits fluid communication between elements as described herein. In similar fashion, FIG. 6 diagrammatically illustrates a second TOBI group that includes the TOBI second entry passages 92B, TOBI second outer radial cavities 90B, and TOBI second exit passages 94B generally aligned with one another at a circumferential position to represent that these elements are generally circumferentially aligned with one another in a manner that permits fluid communication between elements as described herein. FIG. 6 is provided to facilitate the description herein and is not intended to limit the circumferential positioning of these elements. The elements in the first TOBI group and the elements in the second TOBI group may be disposed alternately around the circumference (e.g., first group, second group, first group, etc.), but the present disclosure is not limited to any particular circumferential arrangement.

FIGS. 4 and 5 illustrate mechanical fasteners 102 (e.g., pins) engaging the TOBI forward wall 96 with a vane pressure wall component 122 as will be detailed herein. The mechanical fasteners 102 are circumferentially distributed; e.g., spaced apart from one another around the circumference of the annular TOBI 80.

The inner casing 54 may be a one-piece structure or may comprise a plurality of segments. In the nonlimiting embodiment shown in FIG. 2, the inner casing 54 includes first and second inner casing segments 54A, 54B. The inner casing segments 54A, 54B are disposed radially inward of, and spaced apart from, the inner diffuser case 72, defining an annular cavity therebetween that may be referred to as the "intercooler flow passage 104" or "ICF passage 104". The embodiment shown in FIG. 2 shows flanges from the inner diffuser case 72 and the inner casing segments extending across the ICF passage 104. Apertures are disposed in the flanges at circumferentially spaced apart positions that allow fluid communication through, or between, the aforesaid flanges. The inner casing 54 is disposed radially outside of, and spaced apart from, elements of the HPC hub 106, defining an annular cavity therebetween that may be referred to as the "combustor leakage air passage 108" or "CLA passage 108".

Referring to FIGS. 2, 3, and 3A, the first HPT stator vane stage 60 (which may also be referred to as the "combustor nozzle guide vane" stage) is disposed immediately downstream of the combustor section 32 and upstream of the first HPT rotor stage 110. The first HPT stator vane stage 60 includes a plurality of stator vanes 112, each having an airfoil 114 extending radially between an outer platform 116 and an inner platform 118. The stator vanes 112 are configured to collectively form an annular structure disposed around the axial centerline 22 of the engine 20. Seals 120 (e.g., feather seals-diagrammatically shown) are disposed circumferentially between adjacent outer platforms 116 and between adjacent inner platforms 118. Each vane inner platform 118 includes a pressure wall component 122 and an aft member 124. The pressure wall component 122 is disposed at the forward end of the inner platform 118 and extends radially inward and includes apertures for receiving the mechanical fasteners 102 (e.g., pins) that engage with the TOBI forward wall 96. A seal member 126 is disposed between the pressure wall component 122 and the TOBI forward wall 96. The aft member 124 is disposed at the aft end of the inner platform 118 and extends radially inward. A portion of the pressure wall 122, the underside of the first HPT stator vane inner platforms 118, the aft member 124 of the vane inner platform 118, and a portion of the aft wall 98 of the TOBI 80 define a cavity (which may be referred to as the "first turbine vane cavity 128" or "FTV cavity 128") disposed radially below the first HPT stator vane stage 60.

The engine 20 configuration shown in FIG. 2 includes a rotor disk (referred to hereinafter as the "sideplate minidisk 130") attached to the high-speed shaft. The sideplate minidisk 130 is integrally connected to a sideplate 132 that functions as a cooling flow boundary; i.e., the sideplate 132 forms a portion of the flow path that directs cooling air towards the first HPT rotor stage. Passages 134 are disposed within the sideplate 132, aligned with the TOBI nozzles 88.

Referring to FIGS. 2, 4, and 5, a plurality of seals are utilized to define a TOBI exit compartment 136 disposed downstream of the TOBI nozzles 88. The present disclosure system example shown in FIG. 4 includes one or more first knife-edge seals 138 disposed radially inward of the TOBI nozzles 88, one or more second knife-edge seals 140 disposed radially outward of the TOBI nozzles 88, and one or more third knife-edge seals 142 disposed radially outward of the TOBI nozzles 88. The first knife-edge seals 138 are engaged with a first seal member 144 disposed on an inner radial surface of the TOBI 80. The second knife-edge seal 140 is engaged with a second seal member 146 attached to an outer radial surface of the TOBI 80. The first and second knife-edge seals 138, 140, in combination with the sideplate minidisk 130 and the TOBI 80 define the TOBI exit compartment 136. The third knife-edge seals 142 are engaged with a third seal member 148 attached to the aft wall 98 of the TOBI 80. The second and third knife-edge seals 140, 142, in combination with the sideplate 132 and the TOBI aft wall 98 define an aft TOBI annular compartment 100. The present disclosure is not limited to using knife-edge seals or any particular seal arrangement.

Figure 7:
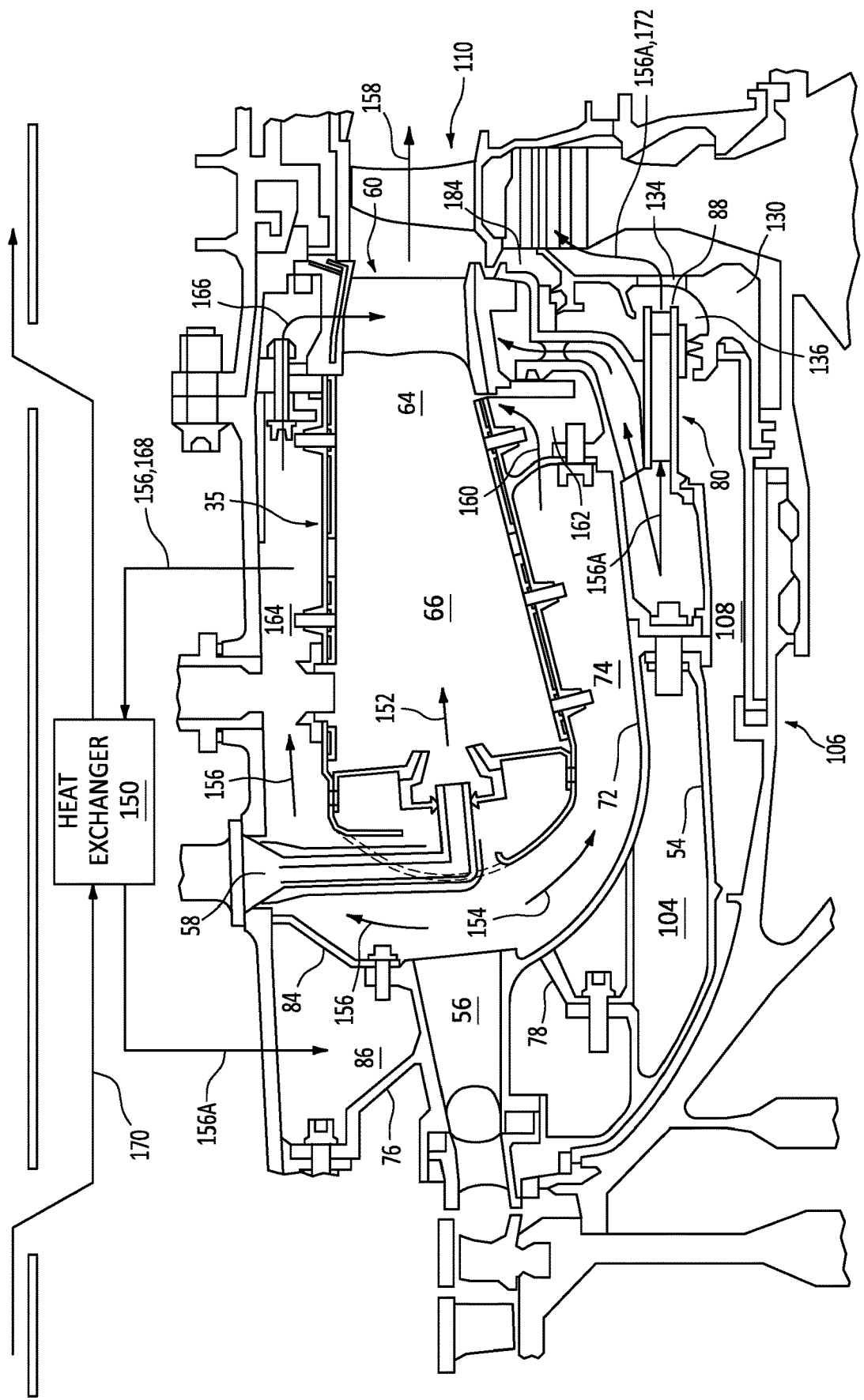
FIG. 7 is a diagrammatic sectioned partial view of a gas turbine engine embodiment, illustrating gas flow path embodiments.
Figure 7A:
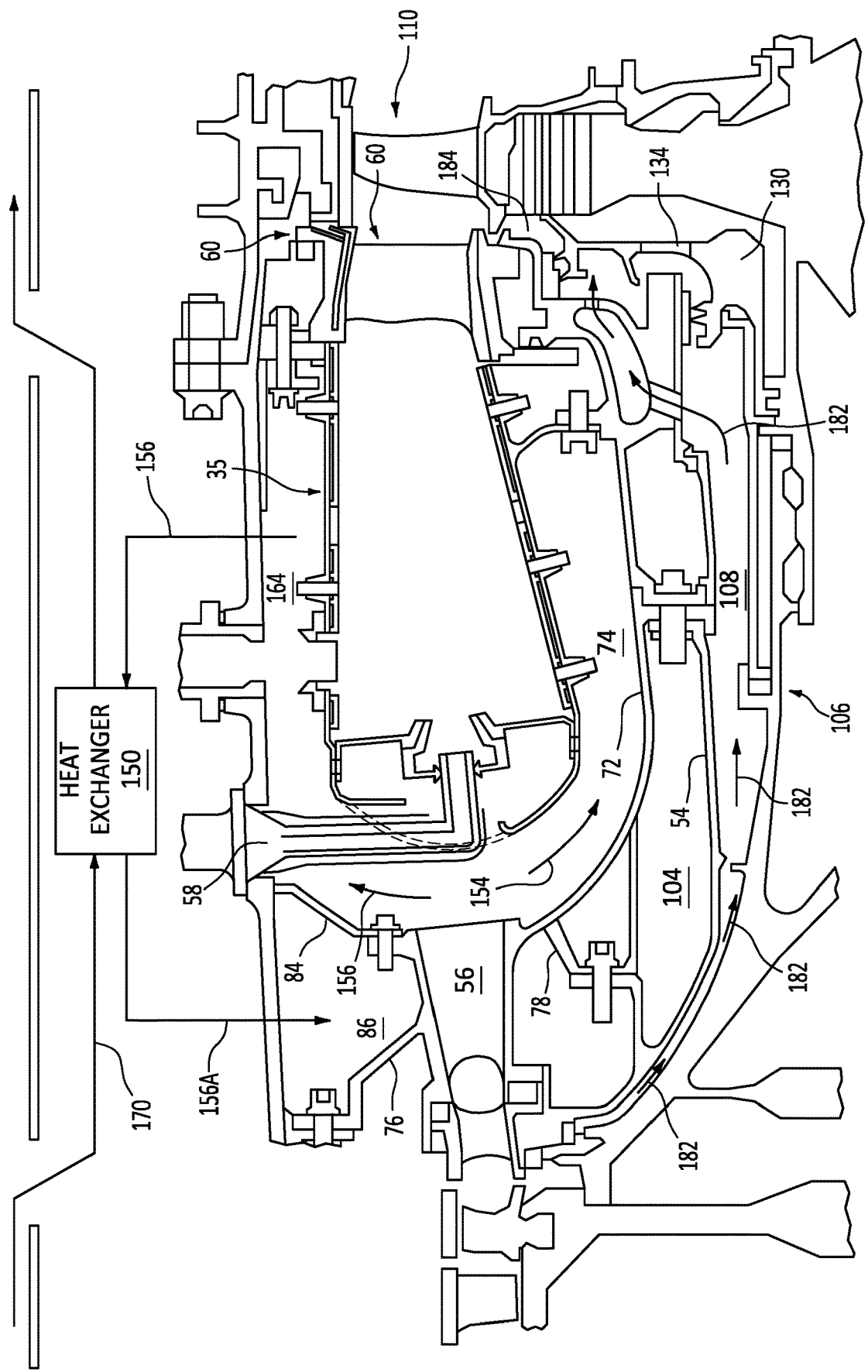
FIG. 7A is a diagrammatic sectioned partial view of a gas turbine engine embodiment, illustrating gas flow path embodiments.

FIGS. 7 and 7A are diagrammatic cross-sectional partial views of gas turbine engine 20 embodiments like that shown in FIG. 2 and described above. The engine 20 embodiments shown in FIGS. 7 and 7A include a heat exchanger 150 for cooling diffuser OD flow. In the embodiment shown in FIGS. 7 and 7A, the heat exchanger 150 (which may be referred to as "intercooler heat exchanger 150") is disposed in a fan air flow passage disposed radially outside of the outer casing 52 that contains air drawn into the engine 20 by the fan section 28. The intercooler heat exchanger 150 may be a two-fluid heat exchanger. The present disclosure is not limited to any particular type of heat exchanger and may use a cooling medium other than fan air.

Gas entering the combustor section 32 from the annular diffuser 56 may be described as comprising three portions (i.e., combustor primary flow 152, diffuser inner diameter (ID) flow 154, and diffuser outer diameter (OD) flow 156) that travel three different paths through the combustor section 32. The combustor primary flow 152 is that portion of the gas exiting the annular diffuser 56 that follows a path through the combustor 35 where it is mixed with fuel and the mixture combusted. The combustion products and any residual air exit the combustor section 32 (via the "core gas path 158") and enter the turbine section 34.

The diffuser ID flow 154 is the portion of the gas exiting the annular diffuser 56 that follows a flow path radially inward of the combustor 35 (i.e., "diffuser ID flow path 74"). Portions of the diffuser ID flow 154 may be used for a variety of purposes including, but not limited to, a gas flow that enters the core gas path 158 forward of, or between, the first HPT stator vanes 112 for cooling and/or purging purposes. Arrow 160 in FIG. 7 illustrates diffuser ID flow that enters the core gas path 158 forward of, or between, the first HPT stator vanes 112. FIG. 7 diagrammatically illustrates the combustor inner radial flange 70 and the inner diffuser case flange 82 (see FIGS. 2, 3B) extending across the diffuser ID flow path 74. Apertures disposed in the aforesaid flanges 70, 82 permit the diffuser ID flow to traverse the flanges and enter the cavity 162 formed forward of the first HPT stator vane stage 60 prior to exiting into the core gas path 158.

The diffuser OD flow 156 is the portion of the gas exiting the annular diffuser 56 that follows a flow path radially outward of the combustor 35 (i.e., the "diffuser OD flow path 164"). Portions of the diffuser OD flow 156 may be used for a variety of purposes including, but not limited to, combustor liner cooling, first HPT stator vane stage cooling, first HPT rotor stage blade outer air seal (BOAS) cooling, and the like.

Arrow 166 in FIG. 7 illustrates a portion of the diffuser OD flow 156 passing from the diffuser OD flow path 164 into the outer radial end of the first HPT stator vanes 112. Arrow 168 in FIG. 7 illustrates a portion of the diffuser OD flow 156 exiting the diffuser OD flow path 164 and being directed through the intercooler heat exchanger 150. FIG. 7 diagrammatically illustrates fan air 170 passing through the heat exchanger 150 functioning as a cooling medium. The diffuser OD flow 156 passing through the heat exchanger 150 decreases in temperature ($T_{exit} < T_{inlet}$). After passing through the heat exchanger 150, the diffuser OD flow 156 (now referred to as "intercooler flow 156A") is directed radially inward to the ICF passage 104. The intercooler flow 156A may pass radially inward through a variety of different passages (e.g., through cavity passages, or through discrete flow tubes or the like) to get to the ICF passage 104. The present disclosure is not limited to any particular passage configuration for intercooler flow 156A to traverse between the intercooler heat exchanger 150 and the ICF passage 104. In some embodiments, embodiments of the present disclosure may include flow control devices 186 (e.g., flow valves, metering valves, venturis, and the like) to provide control of the diffuser OD flow 156 passing into the heat exchanger 150, or intercooler flow 156A exiting the heat exchanger, or any combination thereof.

A portion of the intercooler flow 156A passing through the ICF passage 104 enters the TOBI nozzles 88. The intercooler flow 156A subsequently exits the TOBI nozzles 88 and enters the TOBI exit compartment 136. A substantial portion of the intercooler flow 156A entering the TOBI exit compartment 136 exits the TOBI exit compartment 136 via the passages 134 disposed in the sideplate 132. After traversing the sideplate 132, the intercooler flow 156A may be directed radially outward and into the rotor blades of the first HPT rotor stage 110 as diagrammatically shown by arrow 172.

Another portion of the intercooler flow 156A passing through the ICF passage 104 will enter the TOBI first entry passages 92A and pass into the first TOBI outer radial cavities 90A. The intercooler flow 156A disposed within the first TOBI outer radial cavities 90A may exit through the TOBI first exit passages 94B and enter the FTV cavities 128. Intercooler flow 156A disposed in the FTV cavities 128 may subsequently pass into the first HPT stator vanes 112.

As described herein, both diffuser OD flow and intercooler flow may be used to cool portions of the first HPT stator vane stage 60. More specifically, the diffuser OD flow 156 and the intercooler flow 156A may be directed into different internal portions of the first HPT stator vane airfoils 114.

Figure 8:
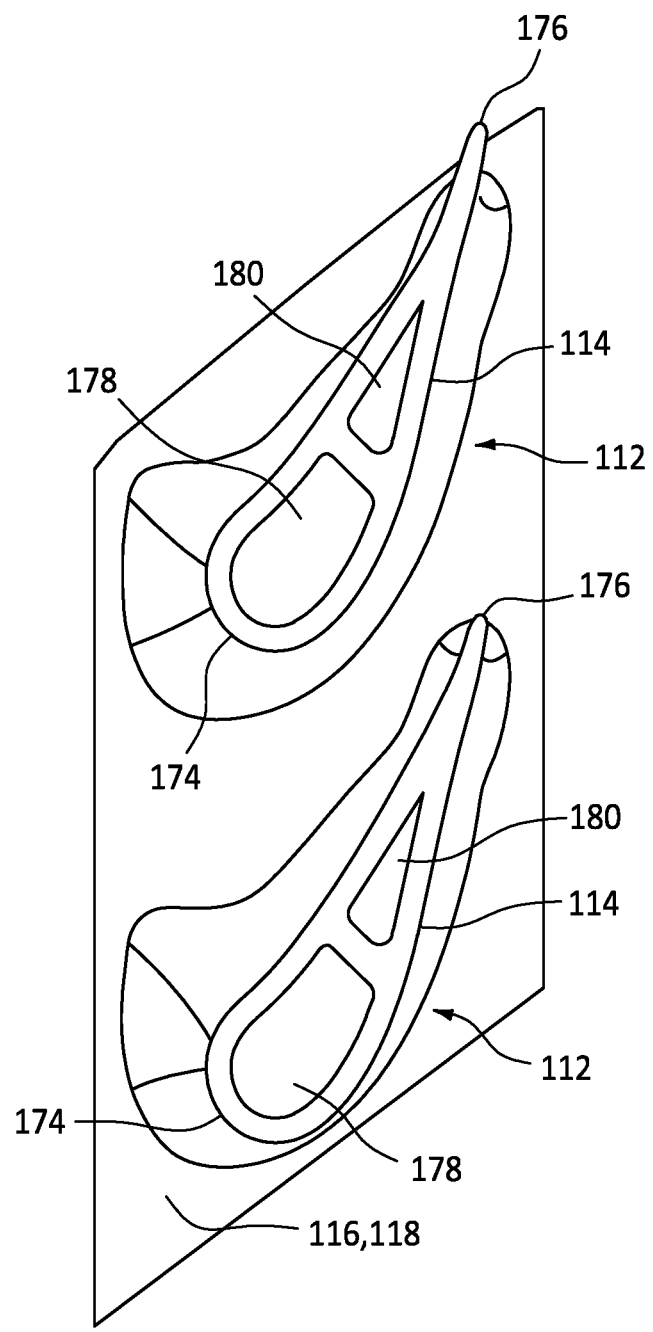
FIG. 8 diagrammatically illustrates a stator vane doublet.

During engine 20 operation, a first HPT stator vane 112 is subject to pressure gradients that generally include a relatively high-pressure region proximate the leading edge 174 of the vane 112 and a relatively low-pressure region proximate the trailing edge 176 of the vane 112. The pressure gradient formed on the suction side of the vane 112 will likely differ from the pressure gradient formed on the pressure side, and there may be variations in both pressure gradients in the radial extent of the airfoil 114. These pressure gradients impact what air may be used to cool the vane 112. Diffuser air that has been compressed within latter stages of the compressor 30 typically possesses sufficient pressure for it to be used as cooling air within a first HPT stator vane 112. The work performed on the air in the compressor 30, however, increases the temperature of the diffuser air. As a result, the diffuser air is less effective as a cooling medium. The present disclosure addresses this issue by using both diffuser air (e.g., diffuser OD flow 156) as well as intercooler air 156A to cool the first HPT stator vanes 112. Intercooler air 156A, produced by passing diffuser OD flow 156 through the intercooler heat exchanger 150, will typically be at a temperature lower than that of the diffuser OD flow 156 as a consequence of passing through the intercooler heat exchanger 150. Air passing through the intercooler heat exchanger 150 will, however, be subject to a pressure loss. Hence, the intercooler air 156A directed to the first HPT stator vanes 112 will be at a lower temperature and pressure relative to diffuser OD flow 156 directed into the first HPT stator vanes 112. The present disclosure provides an improvement over known first HPT stator vane stage 60 cooling configurations by using the diffuser OD flow 156 to cool one or more vane regions proximate the leading edge 174 of the vane 112, and by using intercooler air 156A to cool airfoil regions aft of the vane leading edge 174. FIG. 8 diagrammatically illustrates a stator vane doublet; i.e., a pair of airfoils 114 joined to the same inner and outer platforms. In the diagrammatic view of FIG. 8, only a single platform 116, 118 is shown and the airfoils 114 are sectioned to diagrammatically illustrate cooling regions. FIG. 8 diagrammatically illustrates each of the airfoils 112 as having a forward cooling zone 178 proximate the leading edge 174 and an aft cooling zone 180 proximate the trailing edge 176. The vanes/airfoils 112/114 may be configured such that diffuser OD flow 156 is directed to the forward cooling zones 178 and intercooler air 156A is directed to the aft cooling zones 180 of the vanes/airfoils 112/114. FIG. 8 diagrammatically illustrates the forward and aft cooling zones 178, 180 simplistically bifurcating the airfoils 114 for explanation purposes. The present disclosure contemplates that a first cooling zone may be biased toward the suction side of the airfoil 114, a second cooling zone may be biased toward the pressure side of the airfoil 114, the cooling zones may be asymmetrical with a first cooling zone occupying a smaller volume of the airfoil 114 than a second cooling zone, and so on. The present disclosure is not limited to any particular configurations of cooling zones within a vane 112. The present disclosure is also not limited to any particular vane internal cooling passage configuration. Cooling air may be expelled from a vane airfoil 114 through a vane wall (e.g., at the leading edge, and/or the trailing edge, or anywhere therebetween) or a platform to create convective cooling within the wall/platform and/or film cooling on an exterior surface, or internal passages may be configured to create impingement cooling, or the like, or any combination thereof.

Embodiments of the present disclosure may utilize gas leakage flow off of the compressor. For example, arrow 182 in FIG. 7A diagrammatically illustrates gas leakage (i.e., "compressor leakage flow 182") off of the compressor core gas path forward of the annular diffuser 56; e.g., through an inner diameter leakage slot between the last compressor rotor stage and the last compressor stator vane stage. The present disclosure is not limited to using compressor gas leaked at this position and may use compressor gas leaked elsewhere. The compressor leakage flow 182 may be directed into the CLA passage 108 disposed between the inner casing 54 and elements of the HPC hub 106. The CLA passage 108 extends to a position on the inner radial side of the TOBI 80. As detailed herein and shown in FIG. 5, embodiments of the present disclosure may include second entry passages 92B that provide fluid communication between the CLA passage 108 and second TOBI outer radial cavities 90B; i.e., the second entry passages 92B provide fluid communication between the inner and outer radial sides of the TOBI 80. In these embodiments, the TOBI 80 may include second exit passages 94B that provide fluid communication between the second TOBI outer radial cavities 90B and the aft TOBI annular compartment 100. The second exit passages 94B may be disposed proximate the third knife-edge seals 142 and may be oriented (e.g., skewed relative to the rotational axis of the engine 20) such that gas exits the second exit passages 94B in a circumferential direction that at least partially agrees with the rotational direction of the rotor portions. The third knife-edge seals 142 are configured to allow but control some amount of leakage gas 182 to pass thereby and into a cavity disposed forward of the first HPT rotor stage (i.e., the "FS-HPT rotor forward rim cavity 184"). Leakage gas disposed within the FS-HPT rotor forward rim cavity 184 may subsequently pass into the core gas path 158 forward of the first HPT rotor stage 110. In this manner, the compressor leakage gas 182 can be used to purge the FS-HPT rotor forward rim cavity 184.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axial centerline, comprising:
    a compressor section;
    an outer casing;
    a combustor section having an annular combustor disposed radially inward of the outer casing, the annular combustor having a combustion chamber disposed radially between a combustor outer radial wall structure and a combustor inner radial wall structure;
    wherein the outer casing and the combustor outer radial wall structure define a diffuser outer diameter flow path;
    an annular diffuser disposed between the compressor section and the annular combustor, wherein the annular diffuser is configured to direct diffuser gas towards the combustor section;
    an inner diffuser casing disposed radially inward of the annular combustor and spaced apart from the combustor inner radial wall structure;
    an inner casing disposed radially inward of and spaced apart from the inner diffuser casing, wherein the inner diffuser casing and the inner casing define an intercooler fluid passage (ICF passage);
    a heat exchanger configured to selectively cool a portion of the diffuser gas to provide intercooler gas;
    a first high-pressure turbine (HPT) stator vane stage, having a plurality of first HPT stator vanes;
    wherein a first portion of the intercooler gas is directed through the ICF passage and into the HPT stator vanes;
    wherein the annular combustor is configured such that a first portion of the diffuser gas is directed into the diffuser outer diameter flow path to provide a diffuser OD flow; and
    wherein a first portion of the diffuser OD flow is directed to the heat exchanger, and a second portion of the diffuser OD flow is directed into the first HPT stator vanes.

2. The engine of claim 1, wherein the second portion of the diffuser OD flow is directed into a first internal zone of each respective said first HPT stator vane and the intercooler gas is directed into a second internal zone of each respective said first HPT stator vane.

3. The engine of claim 2, wherein the first internal zone of each respective said first HPT stator vane is independent of the second internal zone of each respective said first HPT stator vane.

4. The engine of claim 3, wherein the first internal zone of each respective said first HPT stator vane is contiguous with a leading edge of the respective said first HPT stator vane.

5. The engine of claim 3, wherein the second internal zone of each respective said first HPT stator vane is contiguous with a trailing edge of the respective said first HPT stator vane.

6. The engine of claim 1, further comprising a tangential onboard injector (TOBI) that extends circumferentially around the engine axial centerline, the TOBI having a plurality of nozzles, an inner radial side, and an outer radial side; and
wherein a second portion of the intercooler air gas is directed through the TOBI nozzles.

7. The engine of claim 6, wherein the TOBI includes a plurality of first TOBI outer radial cavities disposed radially outside of the TOBI nozzles, and a plurality of first TOBI entry passages, each respective first TOBI entry passage configured to provide fluid communication between the ICF passage and a respective first TOBI outer radial cavity.

8. The engine of claim 7, wherein the TOBI includes a plurality of first TOBI exit passages, each respective first TOBI exit passage configured to provide fluid communication between a respective first TOBI outer radial cavity and a first turbine stator vane cavity disposed radially inward of the first HPT stator vane stage.

9. The engine of claim 6, wherein each said first HPT stator vane includes an inner platform having a pressure wall component extending out from at a forward end of the inner platform and an aft member extending out from an aft end of the inner platform.

10. The engine of claim 1, wherein the inner diffuser casing and the combustor inner radial wall structure define a diffuser inner diameter flow path (diffuser ID flow path), and the inner diffuser casing is configured such that a second portion of the diffuser gas (diffuser ID flow) is directed into a core gas path forward of the first HPT stator vane stage.

11. The engine of claim 1, wherein the engine is configured to pass a fan air through the heat exchanger.

12. A gas turbine engine having an axial centerline, comprising:
a compressor section;
an outer casing;
a combustor section having an annular combustor disposed radially inward of the outer casing, the annular combustor having a combustion chamber disposed radially between a combustor outer radial wall structure and a combustor inner radial wall structure;
wherein the outer casing and the combustor outer radial wall structure define a diffuser outer diameter flow path;
an annular diffuser disposed between the compressor section and the annular combustor, wherein the annular diffuser is configured to direct diffuser gas towards the combustor section;
an inner diffuser casing disposed radially inward of the annular combustor and spaced apart from the combustor inner radial wall structure;
an inner casing disposed radially inward of and spaced apart from the inner diffuser casing, wherein the inner diffuser casing and the inner casing define an intercooler fluid passage (ICF passage);
a heat exchanger configured to selectively cool a portion of the diffuser gas to provide intercooler gas;
a first high-pressure turbine (HPT) stator vane stage, having a plurality of first HPT stator vanes; and
a tangential onboard injector (TOBI) extending circumferentially around the engine axial centerline, the TOBI including a plurality of nozzles, an inner radial side, and an outer radial side;
wherein a first portion of the intercooler gas is directed through the ICF passage and into the HPT stator vanes;
wherein a second portion of the intercooler gas is directed through the TOBI nozzles; and
wherein the TOBI includes a plurality of second TOBI outer radial cavities disposed radially outside of the TOBI nozzles, and a plurality of second TOBI entry passages, each respective second TOBI entry passage configured to provide fluid communication from the inner radial side of the TOBI to a respective second TOBI outer radial cavity.

13. The engine of claim 12, wherein the TOBI includes a plurality of second TOBI exit passages, each respective second TOBI exit passage configured to provide fluid communication between a respective second TOBI outer radial cavity and an aft TOBI annular compartment.

14. The engine of claim 13, wherein the second TOBI entry passages are configured to receive compressor leakage air passing from the compressor section.

15. The engine of claim 14, wherein the aft TOBI annular compartment is configured to permit a portion of the compressor leakage air to pass into a cavity disposed forward of a first HPT rotor stage.

16. The engine of claim 9, wherein the pressure wall component of each first HPT stator vane is engaged with the TOBI and a seal is disposed therebetween.

17. The engine of claim 16, wherein the TOBI includes a forward wall and the pressure wall component of each first HPT stator vane is disposed adjacent a portion of the TOBI forward wall and the seal is disposed therebetween.

18. The engine of claim 16, wherein the TOBI includes a plurality of first TOBI exit passages, each respective first TOBI exit passage configured to provide fluid communication between a respective first TOBI outer radial cavity and a first turbine stator vane cavity disposed radially inward of the first HPT stator vane stage, wherein the first turbine stator vane cavity is defined by a portion of the pressure wall component, the first HPT stator vane inner platform, the inner platform aft member, and a portion of an aft wall of the TOBI.

* * * * *